United States Patent [19]

Gorden

[11] 4,152,636
[45] May 1, 1979

[54] FAST DE-EXCITATION BRUSHLESS EXCITER

[75] Inventor: Dale I. Gorden, Munhall, Pa.

[73] Assignee: Westinghouse Electric Corp., Pittsburgh, Pa.

[21] Appl. No.: 841,773

[22] Filed: Oct. 13, 1977

Related U.S. Application Data

[63] Continuation-in-part of Ser. No. 716,047, Aug. 20, 1976, abandoned.

[51] Int. Cl.² .............................................. H02P 9/30
[52] U.S. Cl. ..................................... 322/25; 322/28; 322/73; 361/20
[58] Field of Search ....................... 322/59, 28, 68, 73, 322/68.9, 25; 361/20, 21

[56] References Cited

U.S. PATENT DOCUMENTS

| | | | |
|---|---|---|---|
| 3,401,328 | 9/1968 | Hartung | 322/28 |
| 3,671,850 | 6/1972 | Mehnert et al. | 322/28 |
| 3,683,268 | 8/1972 | Obata | 322/73 |

*Primary Examiner*—Robert J. Hickey
*Attorney, Agent, or Firm*—G. H. Telfer

[57] ABSTRACT

Thyristors are substituted for conventional diodes in the rotating rectifier assembly of a brushless exciter in a synchronous dynamoelectric machine. In contrast with prior systems in which thyristors are switched at relatively high ceiling voltages (requiring thyristors of high power rating and additional components for fast de-excitation), the gates of the thyristors in the present invention are fired only at a low voltage point of the negative half cycle of the polyphase armature voltage waveforms for fast de-excitation and are maintained in a fully conducting condition during the positive half cycle. This permits the use of thyristors having a relatively lower power rating and makes unnecessary additional components to achieve fast de-excitation.

5 Claims, 8 Drawing Figures

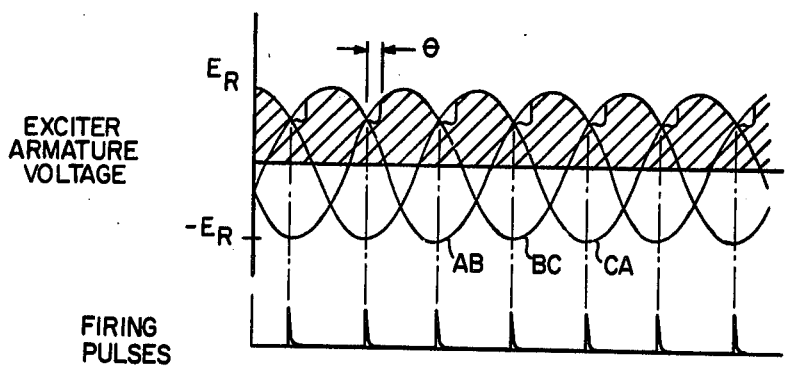
FIG. 5 (FULL GATE)
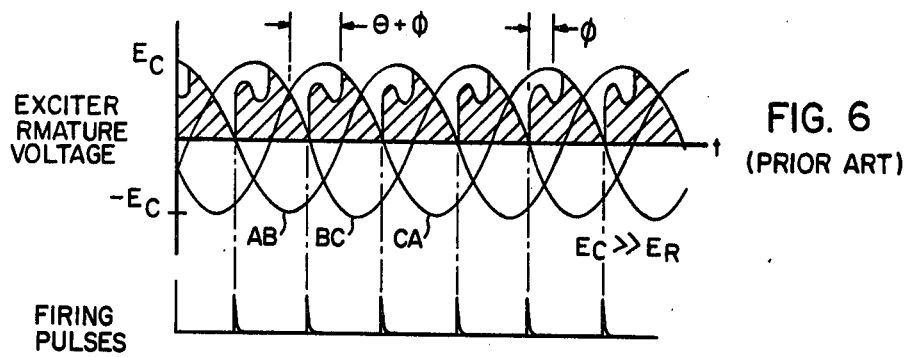
FIG. 6 (PRIOR ART)
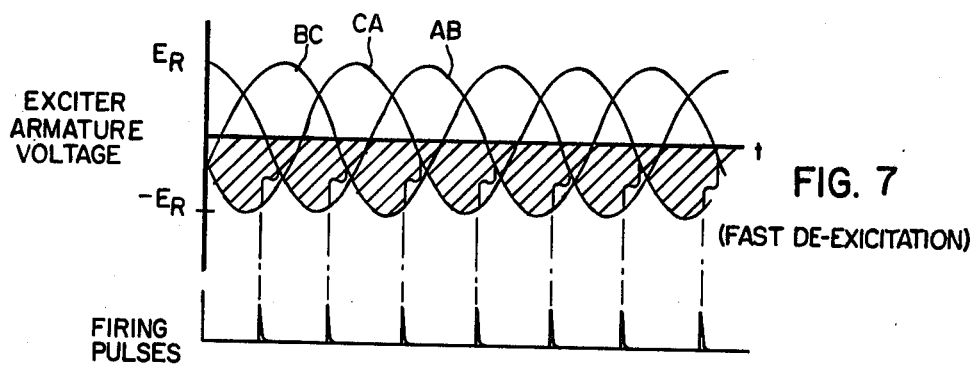
FIG. 7 (FAST DE-EXCITATION)
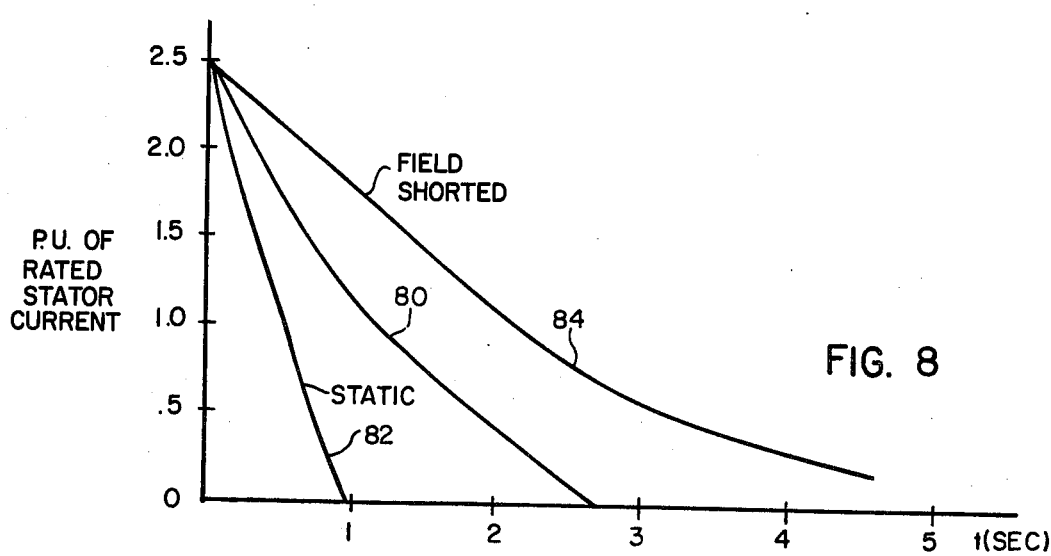
FIG. 8

FAST DE-EXCITATION BRUSHLESS EXCITER

This application is a continuation-in-part of U.S. Patent application No. 716,047 filed on Aug. 20, 1976, now abandoned.

BACKGROUND OF THE INVENTION

1. Field of the Invention:

The present invention relates to excitation systems for synchronous dynamoelectric machines, and more particularly to a method and means for fast de-excitation of the brushless exciter of a synchronous generator.

2. Description of the Prior Art

Brushless excitation systems are now widely used for supplying direct current field excitation to synchronous dynamoelectric machines such as large alternating current generators. Such brushless excitation systems include an alternating current exciter having a stationary field structure and a rotating armature member. A rotating rectifier assembly is carried on a common shaft with the exciter armature and is connected thereto to provide a direct current output. The output of the rectifier is connected to the field winding of the main generator which also rotates with the exciter armature and rectifier. In this way, an excitation system is provided which requires no sliding contacts.

In conventional arrangements, the main exciter for a synchronous generator comprises an alternating current generator having its armature mounted on the same shaft as the field winding of the synchronous machine and also having a stator field winding which must be energized by direct current to create a magnetic field so that a voltage will be induced in the rotating armature of the exciter. In well known arrangements, the direct current excitation for the main exciter is provided by a pilot exciter having a permanent magnet rotor turned by a prime mover within an annular armature winding to produce excitation power for the main exciter. Means such as a rectifier circuit is ordinarily provided to convert the alternating current output of the pilot exciter to direct current for the main exciter field excitation.

With use of a rotating rectifier, efficiency and reliability are achieved through the elimination of maintenance and replacement problems normally associated with brushes, commutators and collector rings. U.S. Pat. Nos. 3,549,919 and 3,705,331 are illustrative as to known brushless exciters which utilize conventional semiconductor diodes. In such arrangements, several semiconductor diodes are connected in parallel for each AC phase and as used heretofore each diode has a separate fuse element in series therewith so as to avoid a direct short between the exciter armature and the generator field upon a shorting failure of the diode, to which semiconductor diodes are susceptible. U.S. Pat. Nos. 3,341,328 and 3,671,850 are illustrative as to the use of controlled rectifiers such as thyristors in place of the conventional diodes in the rotating rectifier assembly of a brushless exciter. Thyristors have proven to be particularly suitable for rotating equipment applications, since they are relatively insensitive to vibration, extreme temperature environments, and accelerative forces. Additionally, they afford relatively fine control of the excitation so that an extremely large range of exciter current is available for both the forcing mode of operation and counter-excitation, more commonly known as fast de-excitation.

In conventional exciter arrangements, it has been the practice of the industry when applying thyristors for excitation control that the armature of the exciter is operated continuously at or near a nominal ceiling voltage, the ceiling voltage being determined by the maximum voltage rating of the rotating rectifier components. In order to vary the excitation, the firing signals to the thyristors are applied only during positive portions of the armature voltage waveforms thereby controlling the excitation to the main generator field. While this brushless excitation arrangement has been employed successfully in some cases, serious problems have emerged which are inherent in this operational mode. For example, because the thyristors are operated continuously near a nominal ceiling voltage, they must be derated to provide excitation control. Also, the exciter size must be chosen according to the continuous rating of the unit at the nominal ceiling voltage so that the conductor size is correspondingly large to accommodate operation at the nominal ceiling voltage level. As would be expected, the cooling requirements for such an arrangement are also increased to accommodate the thermal requirements of the increased mechanical and electrical losses.

Thyristors, with gate control, permit more control over the excitation as compared to the use of conventional diodes for rectification. However, as discussed above, in prior known systems, the thyristors are switched at a relatively high ceiling voltage that requires a high power rating, and additional components are required for fast de-excitation. For the foregoing reasons, it was deemed desirable to improve the design and operation of the controlled rectifier brushless exciter.

SUMMARY OF THE INVENTION

In accordance with the present invention, the conventional diodes of a brushless exciter are replaced with controlled rectifiers such as thyristors. In contrast with conventional thyristor controlled exciters, the armature of the exciter is operated at a voltage level which corresponds with rated voltage output and which is substantially below the nominal ceiling voltage of the exciter. The gates of the thyristors are fired only at a low voltage point of the negative half cycle of the armature voltage waveform for fast de-excitation and are maintained in a full on condition during the positive half cycle of the waveform. This permits the use of thyristors having a lower power rating and makes unnecessary additional components for fast de-excitation.

In a preferred embodiment of the present invention, the main exciter for a synchronous dynamoelectric machine includes a rectifier assembly having an input circuit connected to receive alternating current power from the exciter armature and an output circuit connected to conduct direct current excitation through the synchronous machine rotor field winding. The rectifier assembly comprises a plurality of controlled rectifier elements which are electrically connected in bridge relation between each phase of the polyphase armature winding and the output circuit to conduct current, when gated on, from associated phases of the polyphase armature winding to the direct current field winding of the synchronous dynamoelectric machine. Gating of the controlled rectifiers is provided by control means which is responsive to a predetermined function of the loading condition of the synchronous dynamoelectric machine to provide normal excitation for rated load conditions, forcing excitation for transient loads which exceed rated load, and fast de-excitation when a major fault has occurred. The controlled rectifiers are maintained in a fully-conducting condition with the rectifier elements being rendered conductive only during the positive half cycle of the armature voltage waveform during starting, operation at rated load, and operation at a load level exceeding rated load in the forcing mode of operation.

The controlled rectifiers are maintained in a conducting condition with the rectifier elements being rendered conductive only during the negative half cycle of the armature voltage waveform to provide for fast de-excitation of the exciter upon the occurrence of a predetermined overload condition. By firing the thyristors only during the negative half cycle portions of the armature voltage waveform, the polarity of the voltage applied to the field winding is reversed thus causing de-excitation of the exciter in a substantially shorter time period as compared to the conventional de-excitation means of simply shorting the field winding. Since the armature is operated at a voltage level which corresponds to rated voltage output as opposed to operation at a level near the nominal voltage ceiling, thyristors of a substantially lower power level may be used and the size of the exciter structure may be reduced correspondingly since current requirements and copper sizes are also reduced. Also, since the thyristors are operated in a fully-conducting condition either during the positive half cycle or during the negative half cycle with forcing excitation being provided by the magnetic field of the pilot exciter, there is no derating of the thyristors required for excitation control as in the conventional thyristor control systems which operate at or near the nominal voltage ceiling. This arrangement permits a further reduction in the power rating of the thyristors and makes unnecessary additional components for fast de-excitation and forcing excitation.

BRIEF DESCRIPTION OF THE DRAWING

While the specification concludes with claims particularly pointing out and distinctly claiming that which is regarded as the present invention, the organization, the advantages, and further objects of the invention may be ascertained from the following detailed description when read in conjunction with the accompanying drawing, in which:

FIG. 5 is a graphical representation of the operation of the controlled rectifier assembly of FIG. 1 in a full gate mode of operation;

FIG. 6 is a graphical representation of the operation of a prior art rectifier assembly in which the controlled rectifiers are derated to provide excitation control;

FIG. 7 is a graphical representation of the operation of the controlled rectifier assembly of FIG. 1 in a fast de-excitation mode; and, FIG. 8 is a graphical representation of the decay of the stator current in the turbine generator stator winding of FIG. 1 during fast de-excitation.

DESCRIPTION OF THE PREFERRED EMBODIMENTS

Figure 1:
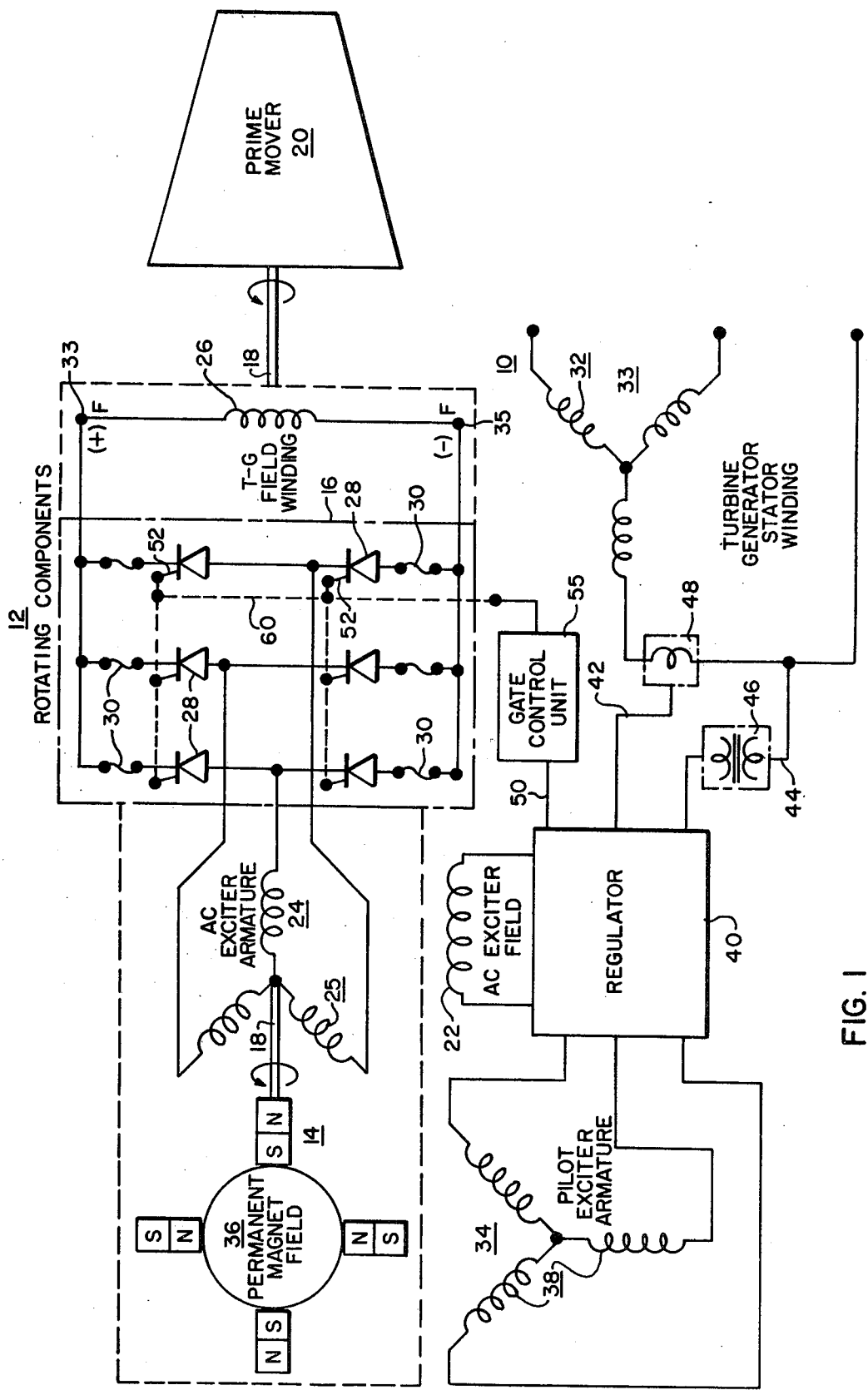
FIG. 1 is a circuit diagram of a synchronous generator and brushless excitation system which incorporates the present invention.

Referring now to FIG. 1, the invention is shown in combination with a synchronous dynamoelectric machine 10 which may be a turbine generator and a brushless excitation system 12 having an alternating current exciter 14 and a rotating recitifer assembly 16 mounted on a common shaft 18 for concurrent rotation by a prime mover 20. The alternating current exciter 14 may be of any suitable type having a stationary stator field member 22 and a rotating armature member 24, the armature member 24 comprising a three phase winding 25 disposed in a core carried on the shaft 18 so as to be rotatable with a main rotor field winding 26 of the synchronous dynamoelectric machine 10. The armature winding 25 is connected to the rotating rectifier assembly 16 which has a plurality of controlled rectifier elements 28 and fuses 30 connected in a conventional bridge arrangement to provide direct current output for excitation of the field winding 26. Although the rectifier assembly is shown in a rotating embodiment, the control rectifier elements 28 and fuses may or may not be rotating, and in the case where they are not rotating, the output of the armature winding 25 is fed to the controlled rectifiers 28 by means of slip rings or other such sliding contacts, and the output of the controlled rectifier assembly is likewise supplied to the field winding 26 also by means of such sliding contacts. The direct current excitation flowing through the rotor field winding 26 establishes a magnetic field which induces current flow within a polyphase stator armature winding 32 of a stator 33 of the synchronous generator 10 when the rotating components of the brushless excitation system are caused to rotate by the prime mover 20.

The main exciter 14 receives its field excitation from a pilot exciter 34 which includes a permanent magnet field member 36 mechanically connected to the shaft 18 for rotation by the prime move 20. As the shaft 18 rotates, the permanent magnet field 36 is rotated within an annular armature winding member 38 in which the alternating current is induced by magnetic induction in the usual manner. The output of the pilot exciter armature winding 38 is connected to a regulator 40 which converts its alternating output to direct current and controls the DC level of the excitation supplied to the AC exciter field 22. The regulator 40 may be of any conventional type and it is responsible to a voltage signal 42 from the synchronous generator stator armature winding 32 and a current signal 44 which is also derived from the stator armature winding 32. The voltage signal 42 may be derived by means of a potential transformer 48 and the current signal may be derived by means of a current transformer 46, both being connected to a suitable branch of the stator armature winding 32.

Figure 3:
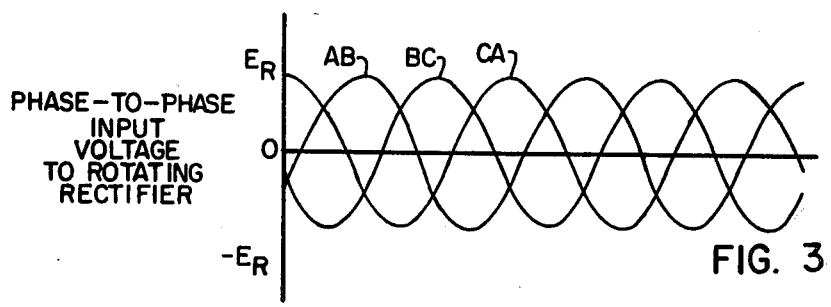
FIG. 3 is a graphical representation of the alternating voltage waveform provided by the polyphase armature winding of the exciter of FIG. 1.

A control signal 50 is developed within the regulator 40 which is generally proportional to a predetermined function of the power output of the synchronous generator. The signal 50 developed by the regulator 40 may be of any suitable function of the voltage and current developed in the stator winding 32; however, in the preferred embodiment of the present invention, the signal 50 comprises preferably two components, a first component which corresponds with operation of the turbine generator 10 during starting at rated load conditions, or under transient loading conditions during a forcing excitation mode of operation. Under any of these conditions, the first component of successive pairs of control signal 50 causes a gate control unit 55 to fire the gates of the controlled rectifiers 28 and the rotating rectifier assembly 16 in the fully conducting condition, with the control rectifiers 28 being rendered conductive only during the positive half cycle portions of the voltage waveform of each respective input phase of the AC exciter armature winding 25. With full gate during the positive half cycles, the controlled rectifier element 28 are operating merely as conventional uncontrolled diodes. Operation of the exciter 14 and the rotating rectifier 16 under these conditions is illustrated in FIG. 3 and FIG. 5 of the drawing. In FIG. 3 of the drawing the phase-to-phase armature voltage input to the rotating rectifier assembly 16 is illustrated. In FIG. 5 of the drawing the angle theta ($\theta$) corresponds to the commutation angle (the time required to switch from phase-to-phase) which is inherent in the operation of the controlled rectifiers, and should not be confused with artificial commutation where conduction is delayed by a greater time period to achieve excitation control as in the prior art.

Figure 4:
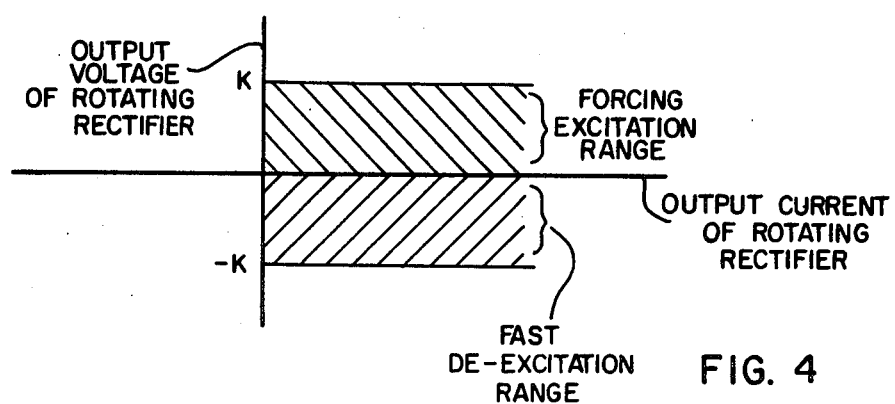
FIG. 4 is a graphical representation of the forcing excitation range and fast de-excitation range of the controlled rectifier circuit illustrated in FIG. 1.

The input and output waveforms for the rotating rectifier assembly 16 is shown in FIGS. 3 and 4 of the drawing. In FIG. 3, the phase-to-phase armature input voltage to the rotating rectifier assembly is shown to be a three phase voltage having a generally symmetrical sinusoidal waveform and having an arbitrary positive and negative amplitude value of the value $E_R$. In FIG. 4, the forcing excitation conducted by the rotating rectifier assembly 16 is seen to vary over a wide range of positive current output and voltage output of a maximum value K which generally corresponds with the amplitude of the input voltage to the rotating rectifier assembly 16. For fast de-excitation, the range has the same general limits, but with the polarity of the voltage output of the rotating rectifier 16 reversed.

Figure 2:
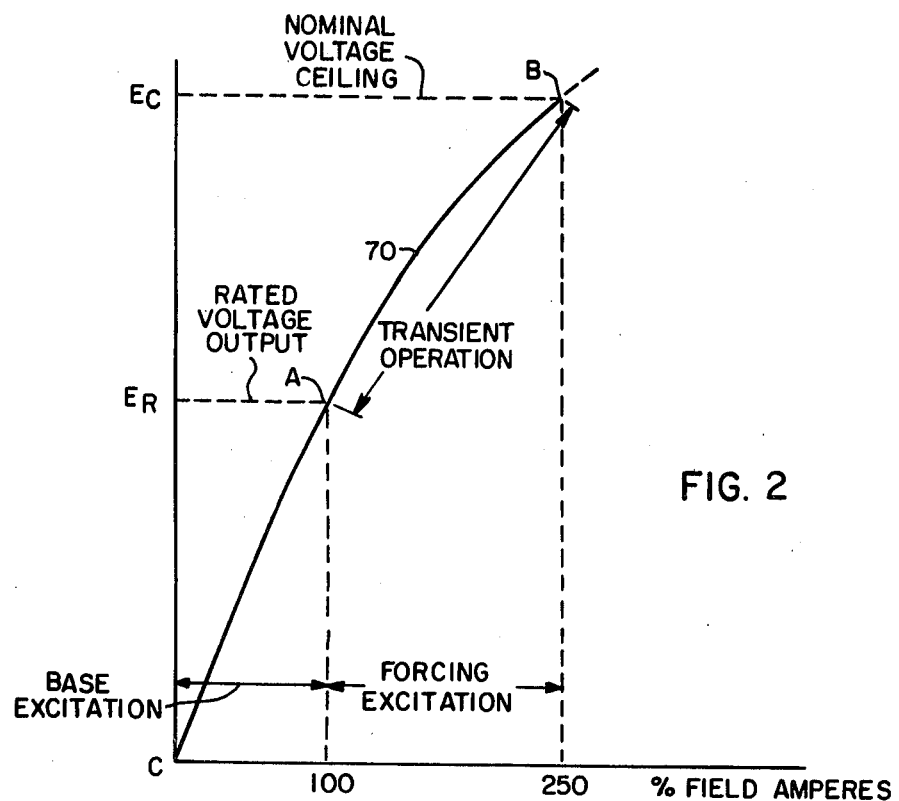
FIG. 2 is a graphical representation of a DC saturation curve for the main exciter of FIG. 1 in which the base excitation and forcing excitation zones are illustrated.

Referring now to FIG. 2, a DC saturation curve 70 of the main exciter 14 is illustrated. The operating point A corresponds with rated voltage output and 100% base excitation provided by the pilot exciter 34. The operating point B corresponds to the nominal voltage ceiling which is determined by the maximum voltage characteristics of the components of the rotating rectifier assembly 16. A portion of the curve 70 between the points A and B represents the transient operation of the main exciter 14 during forcing excitation in response to loads which fluctuate above the base excitation level.

Firing of the gate control elements 52 of the controlled rectifiers 28 is accomplished by any suitable means such as by means of slip rings or preferably by means of a radio telemetry system which is indicated symbolically by the dash lines 60. Any suitable radio telemetry arrangement which includes means for controlling the gating of the controlled rectifiers 28 may be used. For example, a radio control arrangement such as described in U.S. Pat. No. 3,671,850 may be used to good advantage in carrying out the objectives of the present invention.

Under normal operating conditions, that is when the stator winding 32 is supplying power to its rated load, the controlled rectifiers 28 are operated with a full gate until a signal is received which calls for fast de-excitation of the turbine generator 10. Referring to FIG. 2 of the drawing, this operating arrangement corresponds to operation at point A on the DC saturation curve 70. In response to transient load conditions, the AC exciter 14 operates along the portion of the curve between the points A and B in response to forcing excitation provided by the energy stored in the permanent magnet field assembly 36. Upon the occurrence of the second component of the control signal 50 produced by the regulator 40 which would indicate a severe short circuit or some other unusual loading conditions of the turbine generator 10, the gate control unit 55 cooperates with the signal transmitting means 60 to cause the controlled rectifiers 28 to be conductive only during the negative half cycle portions of the armature voltage waveforms shown in FIG. 3 to reverse the polarity of the terminasl 33, 35 of the turbine generator field winding 26. "This is accomplished by firing successive pairs of the controlled rectifiers in the manner shown in FIG. 7. Preferably, firing takes place approximately 20 degrees in advance of the points at which phase-to-phase armature voltages cross on the negative side of the zero axis of the waveforms. It should be understood that after the termination of the first component of the control signal 50 the controlled rectifiers remain conductive during the negative half cycle portions of the armature voltage waveforms, since a large current flowing through the field winding 26 due to its inductance keeps the controlled rectifiers forward-biased. Thus, current continues to flow through the field winding 26 in a downward direction as viewed in FIG. 1. However, as the negative phase-to-phase voltage increases in its magnitude, the resultant current through the winding 26 decreases, which causes a reversal of the polarity of the voltage across the winding according to the expression: $V = L \, di/dt$." During this de-excitation condition the operation of the exciter follows the path of the DC saturation curve 70 between the points A and C to bring the stator current flowing through the stator winding 32 to zero as quickly as possible. This operation, referred to as fast de-excitation, is illustrated generally by the curve 80 in FIG. 8 of the drawing. It should be noted that the de-excitation time required with this arrangement is not as fast as static de-excitation which may be provided by impressing a reverse polarity voltage across the field winding through slip rings from an external source, as illustrated by the curve 82, but is substantially faster than the fast de-excitation time provided by the conventional means of causing the field winding 16 to be merely shortcircuited without reversing the polarity and without the use of auxiliary power, as represented by the curve 84.

During the fast de-excitation mode of operation, the voltage waveform of the exciter armature 24 would change from that of FIG. 5 to that of FIG. 7. "As the firing of controlled rectifiers 28 continues during the negative half cycle portions of the armature voltage waveforms, the current through the field winding 26 and accordingly the stator current in the turbine generator decreases to zero according to the curve 80 in FIG. 8."

The momentary operation of reversing the gating phase of the controlled rectifiers during fast de-excitation has a number of advantages. First of all, the controlled rectifiers 28 do not require derating to provide excitation control since the waveform during operation at normal loads is the same as in a conventional diode, and excitation control is provided by the energy stored in the electromagnetic field of the permanent magnet field assembly 36. Also, the momentary gating of the controlled rectifiers for operation during abnormal loading conditions is less severe. Furthermore, the fact that the exciter 14 is not operating continuously at a nominal ceiling voltage makes the exciter losses correspondingly lower. The size of the AC exciter 14 and of the rotating rectifier assembly 12 is also much smaller because it operates at a rated voltage level which is substantially lower than the nominal ceiling voltage which characterizes prior art arrangements. The amount of copper in the exciter windings 25 is correspondingly lower for this reason.

Under this gating arrangement, the exciter 14 retains its capability for fast response to transient loading conditions. This is provided by the permanent magnet field in the pilot exciter which provides sufficient forcing power to the main exciter field to achieve the required speed of response. The speed of response in such an arrangement is directly proportional to the strength of the magnetic field of the permanent magnet pilot generator, which is in turn directly proportional to the mass of the permanent magnet rotor assembly 36. Thus, for a predetermined level of speed of response, a permanent magnet pilot generator assembly having sufficient reserve power is provided. Thus, base excitation and forcing excitation for the main exciter field winding is provided by the permanent magnet generator with the gate control unit 55 causing the controlled rectifier elements 28 to be fully conductive during the positive half cycle portion of the armature voltage waveforms to provide rated voltage output and to force the output of the main synchronous generator in response to transient load conditions. The pilot exciter operates at nominal power output levels to provide the base excitation for rated voltage output. To comply with forcing excitation requirements, the pilot exciter is rated to provide as much as 2-½ times the base level excitation when the main synchronous generator is responding to transient loads. Thus the response time of such an arrangement where the control rectifier elements are gated fully on during either positive half cycle portions or negative half cycle portions for rated and forcing operation or for fast de-excitation respectively need not be compromised. Furthermore, efficient use of the switching characteristics of the controlled rectifiers 28 is used as compared with the prior art arrangements since the armature is operated at rated voltage levels as opposed to nominal ceiling voltage levels.

While a particular embodiment of the invention has been shown and described for purposes of illustration, equivalent arrangements and embodiments may be practiced by those skilled in the art without departing from the scope and spirit of the invention. It is not desired, therefore, that the invention be limited to the specific arrangement described herein.

I claim:

1. In combination,
   a synchronous dynamoelectric machine having a stator member carrying an alternating current armature winding and a rotor member carrying a direct current field winding;
   a main exciter for said synchronous dynamoelectric machine having a stator member carrying the field winding and a rotor member carrying a polyphase armature winding;
   a rectifier assembly having an input circuit connected to receive alternating current power from said main exciter armature and an output circuit connected to conduct direct current excitation through said synchronous machine rotor field winding, said rectifier assembly comprising:
   a plurality of controlled rectifier elements electrically connected in bridge relation between each phase of said polyphase armature winding and said output circuit to conduct current, when gated on, from associated phases of said polyphase armature winding to said direct current field winding of said synchronous dynamoelectric machine;
   means operable to provide a control signal in response to a predetermined loading condition of said synchronous dynamoelectric machine;
   means responsive to a predetermined function of said control signal connected to control the gating of said controlled rectifiers, said controlled rectifiers being maintained thereby in a fully conducting condition with said rectifier elements being rendered conductive only during the positive half cycle of the voltage waveform of respective associated input phases during starting, operation at rated load, and operation at a load level exceeding rated load in a forcing mode of operation, and said controlled rectifier being maintained in a conducting condition with said rectifier elements being rendered conductive only during the negative half cycle of the respective voltage waveform associated with each phase of said armature winding thereby providing fast de-excitation of said synchronous dynamoelectric machine upon the occurrence of a predetermined overload condition.

2. The combination defined in claim 1 including:
   a pilot exciter having a stator member carrying an armature winding and a permanent magnet rotor member;
   means operable to convert alternating current to direct current having an input circuit connected to receive electrical power from said pilot exciter armature winding and having an output circuit connected to supply direct current excitation to said exciter stator field winding; and,
   means mechanically connecting together said dynamoelectric machine rotor member, said rectifier assembly, said exciter rotor member, and said pilot exciter permanent magnet rotor member for rotation.

3. In a method of developing direct current excitation for the field winding of a synchronous dynamoelectric machine in which polyphase alternating current induced in a rotating exciter armature is rectified by a plurality of controlled rectifier elements electrically connected in a bridge arrangement to conduct current, when gated on, from said armature to said field winding, the improvement comprising:
   maintaining said controlled rectifier elements in substantially full conducting condition during the positive half cycle of the voltage waveform of each associated armature winding phase during starting, operation at rated load, and operation at a load level exceeding rated load in a forcing mode of operation; and,
   gating said controlled rectifier elements to a conducting condition with said controlled rectifier elements being rendered conductive only during the negative half cycle of the voltage waveform associated with each phase of said armature winding thereby providing fast de-excitation of said synchronous dynamoelectric machine.

4. The method of claim 3 wherein said controlled rectifier elements are rendered conductive only at a low voltage point of the positive or negative half cycle of the associated phase of said armature voltage waveform whereby the phase shift caused by the switching operation is minimized and said controlled rectifier elements are maintained in a conducting condition for substantially the entire positive or negative half cycle.

5. The method as defined in claim 3 wherein excitation current for operation at rated load and for transient loading conditions which exceed rated load is provided by a permanent magnetic pilot exciter assembly with said controlled rectifier elements being gated on in the fully conducting condition only during the positive half cycle of the armature voltage waveforms, and excitation power for the fast de-excitation mode of operation also being provided by said permanent magnet pilot exciter assembly with said controlled rectifier elements being rendered conductive only during the negative half cycle portions of said AC exciter armature waveforms so that the polarity of the excitation voltage supplied by the rotating rectifier assembly is reversed with respect to the polarity provided by said rotating rectifier assembly during operation under rated load conditions and during forcing load conditions, the energy for fast de-excitation being provided by the electromagnetic energy stored in the permanent magnet field assembly of the pilot exciter when converted to direct current excitation in said negative polarity relationship.

* * * * *